No. 673,382.  
F. W. CHAFFEE.  
HOSE BAND.  
(Application filed Jan. 5, 1901.)  
Patented May 7, 1901.

(No Model.)

WITNESSES:  
Gustave Dieterich.  
Gunder Gunderson.

INVENTOR  
Frank W. Chaffee,  
BY  
Chas. E. Gill  
ATTORNEY

THE NORRIS PETERS CO., PHOTO-LITHO., WASHINGTON, D. C.

UNITED STATES PATENT OFFICE.

FRANK W. CHAFFEE, OF ALBANY, NEW YORK.

HOSE-BAND.

SPECIFICATION forming part of Letters Patent No. 673,382, dated May 7, 1901.

Application filed January 5, 1901. Serial No. 42,147. (No model.)

*To all whom it may concern:*

Be it known that I, FRANK W. CHAFFEE, a citizen of the United States, and a resident of Albany, in the county of Albany and State of New York, have invented certain new and useful Improvements in Hose-Bands, of which the following is a specification.

The invention relates to improvements in hose-bands; and it consists in the novel features and structure hereinafter described, and particularly pointed out in the claims.

The object of the invention is to produce a more durable and efficient hose-band than any device heretofore known to me for securing the ends of hose to the coupling or ferrule. It is well known that difficulties have been encountered in adequately securing the end of hose for air or steam to hose-couplings, and especially in the case of couplings employed intermediate the adjoining ends of railway-cars. The character of hose and couplings and the uses to which the hose and couplings are put in their employment on railway-cars give rise to conditions rendering it absolutely necessary that the hose should be secured to the couplings in an efficient manner and by means about whose reliability of operation, durability, and action there can be no doubt. The purpose of my invention is to afford a coupling-band which will adequately meet all of the conditions required in the use of articles of this class in connection with the hose and couplings of railway-cars and at the same time one which is of great durability, convenient of application and use, and capable of adaptation to the varying diameters which are necessarily met in the handling of hose and hose-couplings.

The invention will be fully understood from the detailed description hereinafter presented, reference being had to the accompanying drawings, in which—

Figure 1:
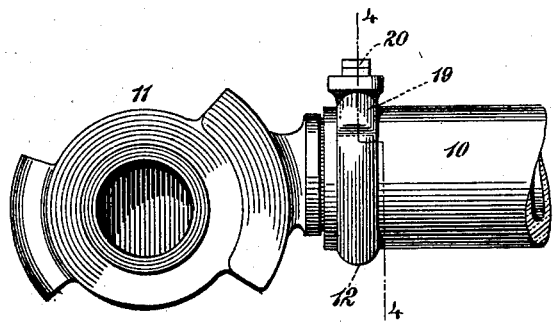
Figure 2:
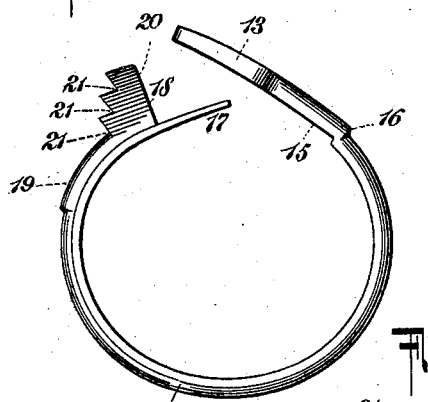
Figure 3:
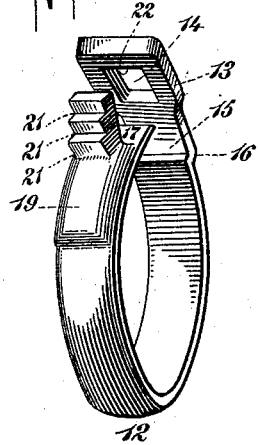
Figure 4:
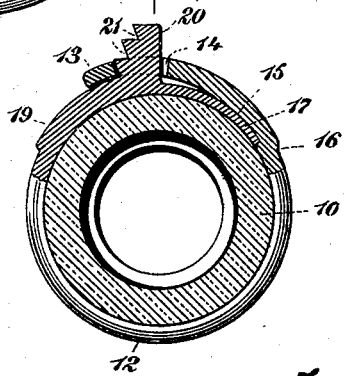

Figure 1 is a side elevation of a piece of hose applied to a hose-coupling by means of a hose-clamp constructed in accordance with and embodying my invention. Fig. 2 is an enlarged side elevation of a hose-clamp constructed in accordance with and embodying the invention. Fig. 3 is a perspective view of same. Fig. 4 is a vertical section, on an enlarged scale, through the hose and clamp on the dotted line 4 4 of Fig. 1.

In the drawings, 10 designates the hose, 11 a coupling of known form and construction, and 12 the hose-band of my invention, said hose-band being shown in position on the hose in Figs. 1 and 4 and on an enlarged scale detached from the hose in Figs. 2 and 3.

The hose-band 12 is formed of substantial thickness and width and by preference is of cast metal. One end of the band 12 is extended laterally to form a broad head 13, within which is provided the elongated opening 14, and at the same end of the band 12 the latter is offset or formed on its inner side with the recess 15 and on its outer side with the shoulder 16, as clearly illustrated in Figs. 2 and 3. The purpose of the recess 15 is to receive the tongue 17, hereinafter referred to, and said offset or shoulder 16 affords adequate means for preserving a proper thickness in the metal, so that the latter shall not be weakened or impaired by the presence of said recess 15. The other end of the band 12 or the one opposite to the end having the said head 13 is formed with the tongue 17, and at its outer side is provided with a lug 18 and an increased thickness of metal 19, the latter extending along the periphery of the band from said lug 18, as shown. The lug 18 projects vertically from the outer face of the band 12 and has a straight edge 20 adjacent to the tongue 17, while its outer edge is on an inclined plane and formed with the recesses 21, adapted when the hose-band is in use to receive the outer wall 22 of the opening 14, provided in the head 13, as clearly illustrated in Fig. 4. The lug 18 is integral with the band 12 and is of substantial character, as shown. The tongue 17, projecting beyond the lug 18, is of reduced thickness, and when the band is in use the said tongue passes below the opposite end of the band and enters the recess 15 thereof, as clearly illustrated in Fig. 4, said tongue aiding in the effectual clamping of the hose and protecting the latter from contact with the joint formed between the head 13 and lug 18.

The form and construction of the hose-band will be fully understood from an inspection of Figs. 2 and 3, while the manner of applying the band to the hose is illustrated in Figs. 1 and 4, in which it will be seen that the band is securely clamped around the hose and has its ends locked to one another by the depression of the head end 13 of the band over the lug 18, the opening 14 in said head 13 passing upon said lug 18 and being caught by some one of the recesses 21 of said lug. The lug 18 is provided with the series of recesses 21, so that the clamp may be adapted to the varying diameters of the hose and couplings which may be met, and in addition the presence of several recesses 21 renders it convenient to tighten the clamp upon the hose should at any time it be found that, due to the previous compression of the hose, the latter may be clamped more tightly. When the outer wall 22 of the recess 14 is in engagement with the lower recess 21 of the lug 18, as shown in Fig. 4, it will be impossible then to tighten the clamp 12 upon the hose to any further extent; but until the said wall 22 of the opening 14 is in the lower recesses 21 of the lug 18 the said clamp may be drawn tighter and tighter around the hose, the said wall engaging the said recesses in series until the lowermost recess 21 is reached by said opening 14. The walls of the recesses 21, against which the front wall 22 of the opening 14 presses, are inclined, as shown in Figs. 2 and 4, and by reason thereof and the like inclination given to the front wall 22 of the opening 14 there is no danger whatever of the internal pressure within the hose forcing the band 12 from its locked position. The greater the internal force the more securely will the band be held in position, since the internal force exerted to force the band outward will operate to the more securely cause the aforesaid wall 22 and the inclined walls of the recesses 21 to cling to one another.

The hose-band hereinbefore described is entirely durable, efficient, and convenient of use, and it fully satisfies the conditions required of hose-bands in their employment for securing the hose to the hose-couplings of railway-cars.

What I claim as my invention, and desire to secure by Letters Patent, is—

1. The hose-band 12 in one integral piece of metal having in one end the vertical opening 14 and on the outer face of the other end the vertical rigid recessed lug 18, which extends directly upward from the surface of the band and over which said opening 14 may be depressed and have its outer wall engaged at one or the other of the recesses in the edge of said lug; substantially as and for the purposes set forth.

2. The hose-band 12 having in one end the vertical opening 14 and recess 15, and on the other end the vertical lug 18 and tongue 17, the latter being adapted to said recess 15, and said lug 18 having the inclined outer side containing recesses 21 adapted to engage the wall of said opening 14 when the latter is depressed over said lug; substantially as set forth.

3. The hose-band 12 having in one end the head 13 containing the vertical opening 14, and on the other end the vertical lug 18 having one straight side 20 and an inclined side containing in its face the series of recesses 21 to engage the wall of said opening 14 when the latter is depressed over said lug; substantially as set forth.

4. The hose-band 12 having in one end the head 13, vertical opening 14 therein, and recess 15, and on the other end the tongue 15, vertical lug 18, an extra thickness of metal 19 extending from the base of said lug; said lug 18 having one straight side 20 and an inclined side containing recesses 21 to engage the wall of said opening 14 when the latter is depressed over said lug; substantially as set forth.

Signed at New York, in the county of New York and State of New York, this 3d day of January, A. D. 1901.

FRANK W. CHAFFEE.

Witnesses:
  CHAS. C. GILL,
  GUNDER GUNDERSON.